(12) United States Patent
Patel et al.

(10) Patent No.: US 9,849,958 B2
(45) Date of Patent: Dec. 26, 2017

(54) PACKAGING AFTERTREATMENT SYSTEM OF ENGINE OF A MARINE VESSEL

(71) Applicant: Electro-Motive Diesel, Inc., LaGrange, IL (US)

(72) Inventors: Ajay Patel, Joliet, IL (US); Richard C. Kulaga, Naperville, IL (US); Deep Bandyopadhyay, Naperville, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 170 days.

(21) Appl. No.: 14/833,775

(22) Filed: Aug. 24, 2015

(65) Prior Publication Data

US 2017/0057606 A1   Mar. 2, 2017

(51) Int. Cl.

| | |
|---|---|
| *B63H 21/32* | (2006.01) |
| *F01N 13/10* | (2010.01) |
| *F01N 13/18* | (2010.01) |
| *F01N 3/20* | (2006.01) |
| *F01N 3/021* | (2006.01) |
| *B63H 21/14* | (2006.01) |

(52) U.S. Cl.
CPC ............. *B63H 21/32* (2013.01); *F01N 13/10* (2013.01); *F01N 13/1805* (2013.01); *B63H 21/14* (2013.01); *F01N 3/021* (2013.01); *F01N 3/2066* (2013.01); *F01N 2590/02* (2013.01)

(58) Field of Classification Search
CPC .............................. B63H 21/32; F01N 3/2066
USPC ....................................................... 440/89 R
See application file for complete search history.

(56) References Cited

U.S. PATENT DOCUMENTS

| | | | | |
|---|---|---|---|---|
| 6,024,617 | A * | 2/2000 | Smullin ................. | B63H 21/32 181/260 |
| 6,226,984 | B1 * | 5/2001 | Ford ...................... | B63H 21/32 60/310 |
| 6,358,109 | B1 * | 3/2002 | Neisen ................... | B63H 21/32 440/89 B |
| 7,536,855 | B2 * | 5/2009 | Tsukahara ............... | F01N 3/28 60/298 |
| 7,674,147 | B2 * | 3/2010 | Zwieg .................... | F01N 13/009 440/88 A |
| 7,717,205 | B2 * | 5/2010 | Kertz ..................... | B60K 13/04 180/68.1 |

(Continued)

FOREIGN PATENT DOCUMENTS

JP   2013213501   10/2013

*Primary Examiner* — Lars A Olson
*Assistant Examiner* — Jovon Hayes

(57) ABSTRACT

A packaging system for enclosing an aftertreatment module associated with an engine is described. The packaging system includes a housing structure configured to enclose the aftertreatment module therein, the housing structure being coupled to an exhaust conduit of the engine. The housing structure includes a base portion and a plurality of side portions extending from the base portion. The base portion and the plurality of side portions define a chamber for receiving the aftertreatment module therein. Further, the packaging system includes a equipment rack configured to receive one or more components of the accessory system. The equipment rack includes a top end and a bottom end, the top end being distal from the bottom end and configured to couple with the base portion of the housing structure. The bottom end of the equipment rack is supported on a floor.

16 Claims, 2 Drawing Sheets

(56) References Cited

U.S. PATENT DOCUMENTS

| | | | | |
|---|---|---|---|---|
| 7,721,537 B2* | 5/2010 | Klinkert | .................. | F01N 1/083 |
| | | | | 60/310 |
| 8,495,869 B2* | 7/2013 | Beissler | .................. | F01N 13/00 |
| | | | | 60/274 |
| 8,607,554 B2* | 12/2013 | Turpin | ...................... | F01N 1/00 |
| | | | | 422/167 |
| 8,938,950 B2* | 1/2015 | Svihla | ..................... | F01N 3/027 |
| | | | | 60/295 |
| 8,950,535 B2* | 2/2015 | Harada | ................. | E02F 9/0866 |
| | | | | 180/296 |
| 9,404,404 B2* | 8/2016 | Schmitt | ................. | F01N 3/2066 |
| 2006/0094312 A1* | 5/2006 | Zwieg | .................... | F01N 3/043 |
| | | | | 440/89 R |
| 2010/0087108 A1* | 4/2010 | White | .................... | B63H 21/32 |
| | | | | 440/89 H |
| 2014/0102085 A1 | 4/2014 | Mori et al. | | |

* cited by examiner

PACKAGING AFTERTREATMENT SYSTEM OF ENGINE OF A MARINE VESSEL

TECHNICAL FIELD

The present disclosure relates, in general, to a packaging system for an engine and, in particular, to the packing system for integrating an aftertreatment module and an equipment rack containing various components of the engine.

BACKGROUND

Marine vessels, such as boats and ships, include an engine for propelling the marine vessel over a water body, such as a sea or a lake. The engine may be disposed in a hull portion of the marine vessel. The engine may include various accessory systems, such as a fuel system, a cooling system and a turbocharger system. The engine also includes an aftertreatment module that is in communication with exhaust gas produced by the engine. The aftertreatment module and various accessory systems may be coupled to the engine. Further, the aftertreatment module is generally disposed on top of a cylinder head of the engine. Since region surrounding and above the engine are confined, space in the hull portion may not be sufficient to accommodate such accessory systems and the aftertreatment module of the engine. Further, such arrangement of the accessory systems around the engine may pose difficulties during maintenance and service of the engine and the accessory systems.

US Patent Publication Number 2014/0102085 discloses a hydraulic excavator having an engine, a rotating frame, a vehicle body frame, a diesel particulate filtering device, a selective catalytic reduction device, and a connecting pipe. The diesel particulate filtering device and the selective catalytic reduction device are supported by a vehicle body frame. At least a portion of the connecting pipe includes an extendable bellows part. The connecting pipe connects the engine and the diesel particulate filtering device. The diesel particulate filtering device is located further away from the engine than the selective catalytic reduction device along a first direction on a horizontal plane. The first tubular body portion of the diesel particulate filtering device and the second tubular body portion of the selective catalytic reduction device are disposed apart from each other with a space therebetween.

SUMMARY OF THE DISCLOSURE

In one aspect of the present disclosure, a packaging system for enclosing an aftertreatment module and an accessory system associated with an engine is described. The packaging system includes a housing structure configured to enclose the aftertreatment module therein. The housing structure is coupled to an exhaust conduit of the engine. Further, the housing structure includes a base portion and a plurality of side portions extending from the base portion. The base portion and the plurality of side portions are together configured to define a chamber to receive the aftertreatment module therein. The packaging system also includes an equipment rack configured to receive one or more components of the accessory system. In addition, the equipment rack includes a bottom end supported on a floor and a top end distal from the bottom end. The top end is configured to couple with the base portion of the housing structure.

In another aspect of the present disclosure, an engine for a marine vessel is provided. The engine includes an exhaust conduit disposed parallel to a longitudinal axis of the engine. The exhaust conduit is configured to receive exhaust gas from the engine therethrough. The engine further includes a packaging system for enclosing an aftertreatment module and an accessory system associated with the engine. The packaging system includes a housing structure configured to enclose the aftertreatment module therein. The housing structure is coupled to the exhaust conduit of the engine. The housing structure includes a base portion and a plurality of side portions extending from the base portion. The base portion and the plurality of side portions are together configured to define a chamber to receive the aftertreatment module therein. The packaging system further includes an equipment rack configured to receive one or more components of the accessory system. The equipment rack includes a bottom end supported on a floor and a top end distal from the bottom end. The top end configured to couple with the base portion of the housing structure.

In yet another aspect of the present disclosure, a packaging system for enclosing an aftertreatment module and an accessory system associated with an engine is provided. The packaging system includes a housing structure configured to enclose the after treatment module therein. The housing structure is coupled to an exhaust conduit of the engine. The housing structure includes a base portion and a plurality of side portions extending from the base portion. The base portion and the plurality of side portions are together configured to define a chamber to receive the aftertreatment module therein. The housing structure further includes an inlet port configured to receive exhaust gas therethrough to communicate with the aftertreatment module and an outlet port configured to discharge the exhaust gas from the aftertreatment module. The packaging system further includes an equipment rack configured to receive one or more components of the accessory system. The equipment rack includes a first set of horizontal connecting members, a second set of horizontal connecting members spaced apart from the first set of horizontal connecting members and a plurality of cross members connected between the first and the second sets of horizontal connecting members. The first and the second sets of horizontal connecting members and the plurality of cross members are together configured to define a space to receive the accessory system therein.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
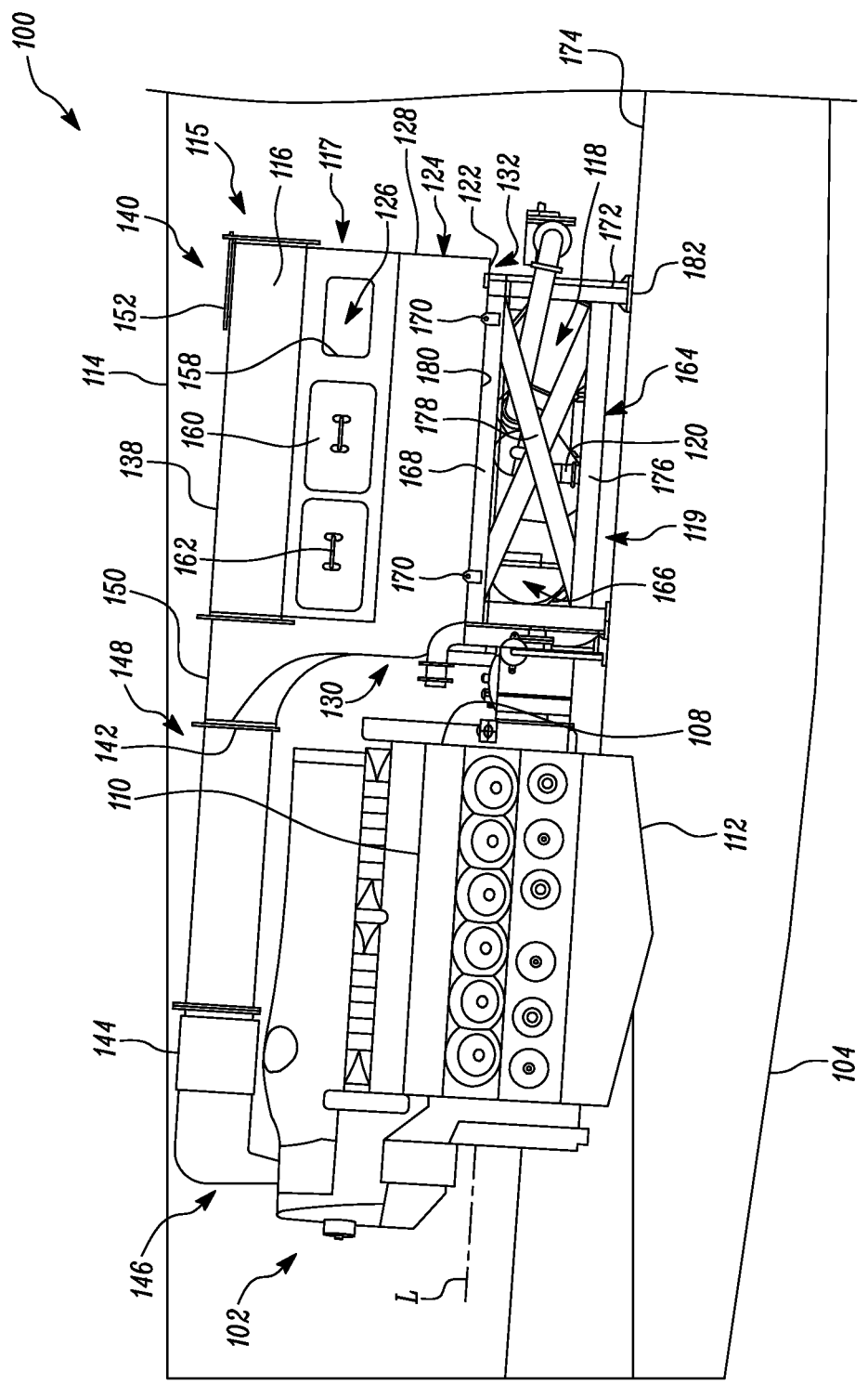
FIG. 1 is a partial side view of a marine vessel having an engine and a packaging system associated with the engine, according to an embodiment of the present disclosure.

FIG. 1 illustrates a partial side view of a marine vessel 100 having an engine 102, according to an embodiment of the present disclosure. The marine vessel 100 may be, for example, a ship or a boat, configured to be operated in a water body, such as a sea, a lake, a canal, and the like. In the illustrated embodiment, the engine 102 is disposed in a hull portion 104 of the marine vessel 100. Further, the engine 102 is disposed adjacent to a stern portion (not shown) of the marine vessel 100. The engine 102 may be configured to provide a rotary power to a propeller (not shown) disposed below the hull portion 104, to propel the marine vessel 100 over the water body.

The engine 102 may be an internal combustion engine run by fuels, such as diesel, gasoline, a gaseous fuel, or a combination thereof. The engine 102 may further include multiple cylinders defined in various configurations, such as 'V' type configuration, in-line configuration, radial configuration, or rotary configuration. In various embodiments, the engine 102 may be used to power any machine, such as on-highway vehicles, off-highway machines, earth moving equipment, or generators. Further, the engine 102 may be employed in other applications, such as a locomotive.

The engine 102 includes a cylinder block 108 for defining the cylinders (not shown) therein. The engine 102 further includes a cylinder head 110 mounted on the cylinder block 108. The cylinder head 110 may define one or more inlet ports for receiving ambient air and one or more outlet ports for discharging exhaust gas from the cylinders. An intake manifold (not shown) may be coupled to the one or more inlet ports for receiving the ambient air therethrough and an exhaust manifold (not shown) may be coupled to the one or more outlet ports for discharging the exhaust gas there through. The engine 102 further includes an oil pan 112 for containing lubrication oil within the engine 102. The engine 102 may also include various systems, such as a fuel supply system, an air intake system, a cooling system, and turbocharger disposed in association with the engine 102.

In the illustrated embodiment, the engine 102 is disposed in an engine room defined in the hull portion 104 below a deck portion 114 of the marine vessel 100. The engine 102 is further coupled with a packaging system 115 enclosing an aftertreatment module 116 and an accessory system 118 of the engine 102. The engine 102 and the packaging system 115 are disposed within a space available in the hull portion 104 bellow the deck portion 114. The packaging system 115 includes a housing structure 117 for enclosing the aftertreatment module 116 therein and an equipment rack 119 for accommodating one or more components 120 of the accessory system 118. In one example, the one or more components 120 of the accessory system 118 may be associated with cooling of various fluids of the engine 102, such as oil, fuel and coolant and may include a heat transfer unit, a filter, a pump, and hoses and/or pipes for fluidly coupling each of the one or more components 120. The housing structure 117 is supported on the equipment rack 119. In an example, the accessory system 118 may be a cooling system provided to control the temperature of the engine 102. As such, the cooling system may include a cooling agent, such as water and oil, to cool various portions of the engine 102. For the purpose of cooling, the cooling system may also include a pump (not shown) configured to circulate the cooling agent to the various portions of the engine 102.

The aftertreatment module 116 is configured to control emission of the exhaust gas produced by the engine 102. In one example, the aftertreatment module 116 may include a Diesel Particulate Filter (DPF) system (not shown) and a Selective Catalytic Reduction (SCR) system (not shown). The DPF system may include a Diesel Oxidation Catalyst (DOC) and a DPF. The DOC may aid in reducing hydrocarbons and carbon monoxide in the exhaust gas. As the exhaust gas passes through the DPF, particulate matter contained in the exhaust gas may be trapped by the DPF and prevented from being released to the atmosphere. The SCR system may include Diesel Exhaust Fluid (DEF) and a SCR catalyst. The DEF may be sprayed into the exhaust gas to activate the SCR catalyst, so that the SCR catalyst may convert the Nitrogen Oxide, present in the exhaust gas, into Nitrogen and water vapor.

The housing structure 117 is configured to receive the DPF system and the SCR system therein. Further, the housing structure 117 is adapted to be disposed beside the engine 102 to optimally use the space available in the hull portion 104 below the deck portion 114. The accessory system 118 of the engine 102 is supported in the equipment rack 119 that is disposed beside the engine 102 and below the housing structure 117.

Figure 2:
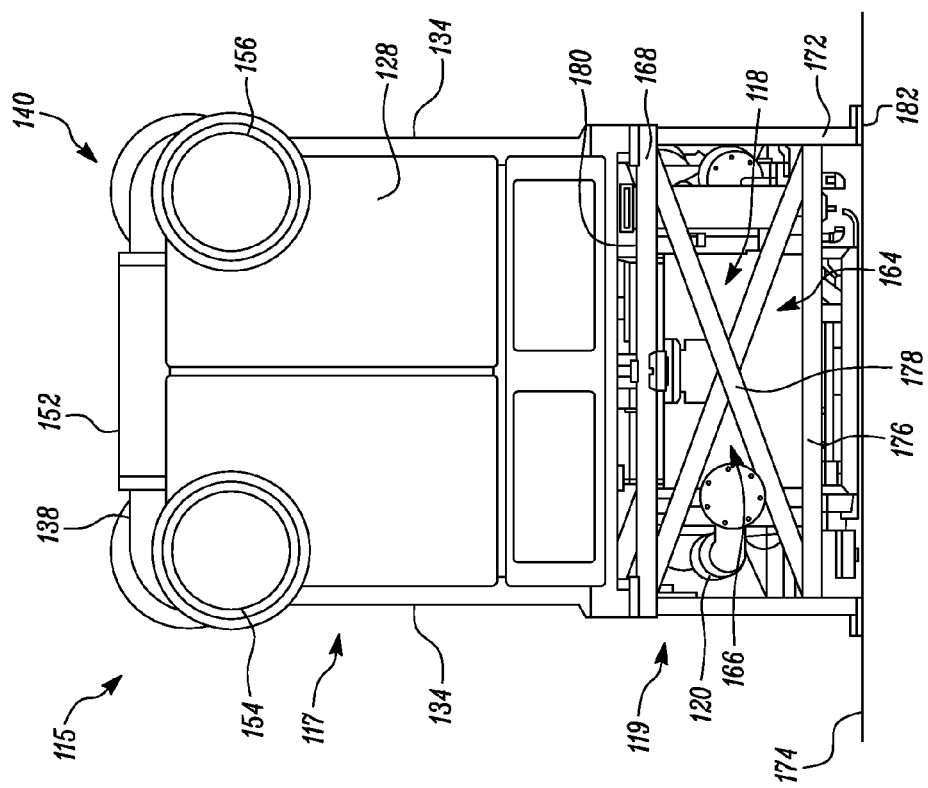
FIG. 2 is a front view of the engine and the packaging system coupled to the engine, according to an embodiment of the present disclosure.

FIG. 2 illustrates a side view of the engine 102 and the packaging system 115, according to an embodiment of the present disclosure. Referring to FIGS. 1 and 2, the housing structure 117 includes a base portion 122 and a plurality of side portions 124 extending from the base portion 122. The base portion 122 and the plurality of side portions 124 are together configured to define a chamber 126 for receiving the aftertreatment module 116. In one embodiment, the side portions 124 may be integrally formed with the base portion 122. In another embodiment, the side portions 124 may be separately coupled to the base portion 122. In the illustrated embodiment, the plurality of side portions 124 includes a pair of first side portions 128. One side portion of the pair of the first side portions 128 extends from a first end 130 of the base portion 122 and another side portion of the pair of first side portions 128 extends from a second end 132 of the base portion 122. The plurality of side portions 124 further includes a pair of second side portions 134 extending between the pair of first side portions 128. The first side portions 128 and the second side portions 134 are together configured to define the chamber 126 to receive the aftertreatment module 116 therein.

The housing structure 117 further includes a top portion 138 defined at a top end 140 of the housing structure 117 thereof. In one embodiment, the top portion 138 may be integrally formed with the plurality of side portions 124. In another embodiment, the top portion 138 may be separately coupled to the pair of the first side portions 128 and the second side portions 134.

The housing structure 117 further includes an inlet port 142 defined at one of the side portions 124. In the illustrated embodiment, the inlet port 142 is defined at one side portion from among the pair of the first side portions 128. The inlet port 142 is configured to be coupled with an exhaust conduit 144 of the engine 102. The exhaust conduit 144 is configured to be in communication with the exhaust manifold of the engine 102 to receive the exhaust gas therethrough. The exhaust conduit 144 is disposed parallel to a longitudinal axis 1' of the engine 102. In the illustrated embodiment, the exhaust conduit 144 is disposed between the cylinder head 110 of the engine 102 and the deck portion 114 of the marine vessel 100. In various embodiments, the exhaust conduit 144 may be disposed at any location in the hull portion 104 below the deck portion 114. The exhaust conduit 144 further includes a first end 146 configured to be coupled to the exhaust manifold of the engine 102 and a second end 148 configured to be coupled to the inlet port 142 of the housing structure 117. Owing to such arrangement, the exhaust gas produced by the engine 102 passes through the exhaust conduit 144 and subsequently to the aftertreatment module 116. The inlet port 142 is further defined by a duct 150 extending from one first side portion of the pair of first side portion 128. The duct 150 is defined adjacent to the top portion 138 of the housing structure 117.

The housing structure 117 further includes an outlet port 152 defined in the top portion 138, to discharge the exhaust gas to the atmosphere from the packaging system 115. In other embodiments, the outlet port 152 may be defined at any location in the housing structure 117. An additional exhaust conduit (not shown) may be coupled to the outlet port 152 to discharge the exhaust gas to the atmosphere from the housing structure 117.

The housing structure 117 further includes a first duct 154 defined adjacent to the top end 140 thereof. The first duct 154 may be defined adjacent to one of the pair of second side portions 134 and may extend between the first end 130 and the second end 132 of the base portion 122. In one example, the cross-section of the first duct 154 may be, but not limiting to, a circle. In another example, the cross-section of the first duct 154 may be a square, a rectangular, a polygonal, or any other shape known in the art. The first duct 154 may be configured to receive at least one of the DPF system and the SCR system of the aftertreatment module 116 therein.

A second duct 156 is defined adjacent to the top end 140 spaced apart from the first duct 154. The second duct 156 may be defined adjacent to another second side portion of the pair of second side portions 134 and may extend between the first end 130 and the second end 132 of the base portion 122. The second duct 156 may be disposed parallel to the first duct 154. In one example, the cross-section of the second duct 156 may be, but not limiting to, a circle. In another example, the cross-section of the second duct 156 may be a square, a rectangular, a polygonal, or any other shape known in the art. The second duct 156 may be configured to receive at least one of the DPF system and the SCR system of the aftertreatment module 116 therein. In an example, the DPF system may be received in the first duct 154 and the SCR system may be received in the second duct 156. The DPF system may be further communicated with the SCR system within the chamber 126. The exhaust gas coming through the inlet port 142 may be communicated with the DPF system disposed in the first duct 154 and may further communicate with the SCR system disposed in the second duct 156. The exhaust gas may be further discharged through the outlet port 152 to the atmosphere.

The housing structure 117 further includes a plurality of openings 158 defined in one of the pair of second side portions 134. The aftertreatment module 116 may be accessed through the openings 158 during any maintenance and service activity. Further, the catalyst, such as the DOC and SCR may be received through the openings 158. In another embodiment, the openings 158 may be defined in each of the pair of second side portion 134. In other embodiments, the openings 158 may be defined at any location in the housing structure 117 to access the aftertreatment module 116 and to receive the catalyst therethrough. The housing structure 117 further includes a door member 160 for closing each of the openings 158. A handle 162 may be provided on the door member 160 to allow an operator access the chamber 126.

The equipment rack 119 further includes a plurality of connecting members 164 coupled together to define a space 166 therein to accommodate the one or more components 120 of the accessory system 118. Each of the plurality of connecting members 164 may be an elongated body, such as a bracket, coupled to one another through fastening members, such as bolts and nuts. It may be contemplated that each of the plurality of connecting members 164 may be coupled to each other via known fastening members, such as rivets and screws. The space defined by the plurality of connecting members 164 may be further configured for disposing various components associated with the accessory system 118. Various supporting members, holding members, coupling members and fastening members may be disposed within the space 166 to hold various components of the accessory system 118 within the space 166. A volume of the space 166 may be defined based on various parameters including, but not limited to, number of components, size and shape of the components, functioning of the components, and maintenance and/or servicing of the components of the accessory system 118.

Further, the equipment rack 119 may have a top end 180 and a bottom end 182. As it would be understood from the FIG. 1, the top end 180 and the bottom end 182 may be separated by the plurality of leg members 172. Accordingly, distance between the top end 180 and the bottom end 182 of the equipment rack 119 may be substantially equal to the length of the plurality of leg members 172. The top end 180, that is distal from the bottom end 182, is configured to be coupled to the base portion 122 of the housing structure 117. The bottom end 182 may be supported on the floor 174 of the marine vessel 100.

In the illustrated embodiment, the plurality of connecting members 164 includes a first set of horizontal connecting members 168 configured to couple with the base portion 122 of the housing structure 117. In one embodiment, the first set of horizontal connecting members 168 may form a frame, such as a square frame or a rectangular frame having an outer perimeter greater than or equal to an area defined by the base portion 122. Further, one or more additional members may be disposed within the frame defined by the first set of horizontal connecting members 168 to support the housing structure 117. The base portion 122 may be coupled to the first set of horizontal connecting members 168 via fastening members 170, such as bolts and nuts. It may be contemplated that various other known fastening method may be used for coupling the base portion 122 of the housing structure 117 with the first set of horizontal connecting members 168. In other embodiment, the first set of horizontal connecting members 168 may be coupled together in any shape for coupling with the base portion 122 of the housing structure 117. The equipment rack 119 includes a plurality of leg members 172 extending from the first set of horizontal connecting members 168. The plurality of leg members 172 are configured to be in contact with a floor 174 of the marine vessel 100.

The plurality of connecting members 164 further includes a second set of horizontal connecting members 176 spaced apart from the first set of horizontal connecting members 168. The second set of horizontal connecting members 176 is coupled between the plurality of leg members 172 to reinforce a strength of the equipment rack 119. Further, one or more additional members may be coupled between the second set of horizontal connecting members 176 to support and couple various components of the accessory system 118. The plurality of connecting members 164 further includes a plurality of cross members 178 connected between the first set of horizontal connecting member 168 and second set of horizontal connecting members 176 to further reinforce the strength of the equipment rack 119 and to support various components of the accessory system 118. Thus, the various components of the accessory system 118 is integrated and disposed within the space 166 defined by the first set of horizontal connecting member 168, second set of horizontal connecting members 176, and the plurality of cross members 178.

INDUSTRIAL APPLICABILITY

The present disclosure relates to the packaging system 115 for the aftertreatment module 116 and the accessory system 118 associated with the engine 102. The packaging system 115 includes the housing structure 117 for enclosing the DPF system, the SCR system and various other components associated with the aftertreatment module 116 and the equipment rack 119 for disposing various components of the accessory system 118. The housing structure 117 is coupled to the engine 102 via the exhaust conduit 144 such that the equipment rack 119 integrating the accessory system 118 is disposed below the housing structure 117. Thus, the packaging system 115 including the housing structure 117 and the equipment rack 119 is disposed proximal to the engine 102 in the hull portion 104 below the deck portion 114 of the marine vessel 100. Since the aftertreatment module 116 is integrated within the housing structure 117, the housing structure 117 may be disposed at any location in communication with the engine 102 to optimize the space available in the hull portion 104 of the marine vessel 100. Further, the exhaust conduit 144 may be adapted to any shape or configuration to couple with the housing structure 117 with the exhaust manifold of the engine 102.

By integrating the aftertreatment module 116 and the accessory system 118 within the packaging system 115, the space available in the hull portion 104 below the deck portion 114 may be optimally utilized to dispose the engine 102 therein. The aftertreatment module 116 and the accessory system 118 are integrated to dispose in the engine room for using with a medium speed engine. Further, servicing and maintenance of the aftertreatment module 116 and the accessory system 118 may be performed easily without disturbing other components surrounding of the engine 102 as the aftertreatment module 116 and the accessory system 118 are isolated each other. The openings 158 in the housing structure 117 may also facilitate servicing or maintenance of the aftertreatment module 116. With the integration of the aftertreatment module 116 and the accessory system 118, additional space may be obtained in the hull portion 104 to facilitate an operator to comfortably perform maintenance or servicing of the aftertreatment module 116 and the accessory system 118.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A packaging system for enclosing an aftertreatment module and an accessory system associated with an engine, the packaging system comprising:
    a housing structure configured to enclose the after treatment module therein, the housing structure coupled to an exhaust conduit of the engine, the housing structure comprising:
        a base portion; and
        a plurality of side portions extending from the base portion, wherein the base portion and the plurality of side portions are together configured to define a chamber to receive the aftertreatment module therein; and
    an equipment rack configured to receive one or more components of the accessory system, the equipment rack comprising:
        a bottom end supported on a floor; and
        a top end distal from the bottom end, the top end configured to couple with the base portion of the housing structure, wherein the equipment rack comprises a plurality of connecting members, wherein the plurality of connecting members are coupled together to define a space therein to accommodate the one or more components of the accessory system, wherein the plurality of connecting members comprises:
            a first set of horizontal connecting members;
            a second set of horizontal connecting members spaced apart from the first set of horizontal connecting members; and
            a plurality of cross members connected between the first and second sets of horizontal connecting members,
                wherein the first and second sets of horizontal connecting members and the plurality of cross members are together configured to define the space.

2. The packaging system of claim 1, wherein the housing structure comprising:
    an inlet port configured to couple with the exhaust conduit of the engine to receive exhaust gas therethrough and communicate with the aftertreatment module; and
    an outlet port configured to discharge the exhaust gas from the aftertreatment module.

3. The packaging system of claim 2, wherein the housing structure comprising:
    a first duct defined adjacent to a top end thereof; and
    a second duct defined adjacent to the top end spaced apart from the first duct,
    wherein the outlet port is defined in a top portion extending between the first duct and the second duct.

4. The packaging system of claim 1, wherein the plurality of side portions comprises:
    a pair of first side portions extending from a first end and a second end of the base portion; and
    a pair of second side portions extending between the pair of first side portions,
    wherein the pair of first and second side portions are together configured to define the chamber.

5. The packaging system of claim 1, wherein the housing structure comprising an opening for accessing the aftertreatment module therethrough.

6. The packaging system of claim 1, wherein the equipment rack comprises a plurality of leg members extending from the second set of horizontal connecting members, the plurality of leg members are configured to be in contact with the floor.

7. The packaging system of claim 1, wherein the first set of horizontal connecting members is coupled with the base portion of the housing structure.

8. An engine for a marine vessel comprising:
    an exhaust conduit disposed parallel to a longitudinal axis of the engine, the exhaust conduit configured to receive exhaust gas from the engine therethrough; and
    a packaging system for enclosing an aftertreatment module and an accessory system associated with the engine, the packaging system comprising:

a housing structure configured to enclose the aftertreatment module therein, the housing structure coupled to the exhaust conduit of the engine, the housing structure comprising:
  a base portion; and
  a plurality of side portions extending from the base portion, wherein the base portion and the plurality of side portions are together configured to define a chamber to receive the aftertreatment module therein; and
an equipment rack configured to receive one or more components of the accessory system, the equipment rack comprising:
  a bottom end supported on a floor; and
  a top end distal from the bottom end, the top end configured to couple with the base portion of the housing structure, wherein the equipment rack comprises a plurality of connecting members, wherein the plurality of connecting members are coupled together to define a space therein to accommodate the one or more components of the accessory system, wherein the plurality of connecting members comprises:
    a first set of horizontal connecting members;
    a second set of horizontal connecting members spaced apart from the first set of horizontal connecting members; and
    a plurality of cross members connected between the first set of horizontal connecting members and the second sets of horizontal connecting members,
    wherein the first set of horizontal connecting members, the second sets of horizontal connecting members, and the plurality of cross members are together configured to define the space.

9. The engine of claim 8, wherein the housing structure comprising:
  an inlet port configured to couple with the exhaust conduit of the engine to receive exhaust gas therethrough and communicate with the aftertreatment module; and
  an outlet port configured to discharge the exhaust gas from the aftertreatment module.

10. The engine of claim 9, wherein the housing structure comprising:
  a first duct defined adjacent to a top end of the housing structure thereof; and
  a second duct defined adjacent to the top end and spaced apart from the first duct,
  wherein the outlet port is defined in a top portion extending between the first duct and the second duct.

11. The engine of claim 8, wherein the plurality of side portions comprises:
  a pair of first side portions extending from a first end and a second end of the base portion; and
  a pair of second side portions extending between the pair of first side portions,
  wherein the pair of first side portions and the pair of second side portions are together configured to define the chamber.

12. The engine of claim 11, wherein the housing structure comprising an opening for accessing the aftertreatment module therethrough.

13. The engine of claim 8, wherein the equipment rack comprises a plurality of leg members extending from the second set of horizontal connecting members, the plurality of leg members are configured to be in contact with the floor.

14. The engine of claim 8, wherein the first set of horizontal connecting members is coupled with the base portion of the housing structure.

15. A packaging system for enclosing an aftertreatment module and an accessory system associated with an engine, the packaging system comprising:
  a housing structure configured to enclose the aftertreatment module therein, the housing structure coupled to an exhaust conduit of the engine, the housing structure comprising:
    a base portion; and
    a plurality of side portions extending from the base portion, wherein the base portion and the plurality of side portions are together configured to define a chamber to receive the aftertreatment module therein;
    an inlet port configured to receive exhaust gas therethrough and communicate with the aftertreatment module;
    an outlet port configured to discharge the exhaust gas from the aftertreatment module;
  an equipment rack configured to receive one or more components of the accessory system, the equipment rack comprising:
    a first set of horizontal connecting members;
    a second set of horizontal connecting members spaced apart from the first set of horizontal connecting members; and
    a plurality of cross members connected between the first set of horizontal connecting members and the second sets of horizontal connecting members,
    wherein the first set of horizontal connecting members, the second sets of horizontal connecting members, and the plurality of cross members are together configured to define a space to receive the accessory system therein.

16. The packaging system of claim 15, wherein the housing structure comprising an opening for accessing the aftertreatment module therethrough.

* * * * *